(12) United States Patent
Hauck

(10) Patent No.: US 8,158,896 B2
(45) Date of Patent: Apr. 17, 2012

(54) WEIGHING SENSOR HAVING A STOP STRUCTURE

(75) Inventor: Timo Hauck, Kaiserlautern (DE)

(73) Assignee: Wipotec Wiege-und Positioniersysteme GmbH, Kaiserslautern (DE)

( * ) Notice: Subject to any disclaimer, the term of this patent is extended or adjusted under 35 U.S.C. 154(b) by 601 days.

(21) Appl. No.: 12/161,545

(22) PCT Filed: Jan. 19, 2007

(86) PCT No.: PCT/DE2007/000086
§ 371 (c)(1),
(2), (4) Date: Apr. 29, 2009

(87) PCT Pub. No.: WO2007/082512
PCT Pub. Date: Jul. 26, 2007

(65) Prior Publication Data
US 2010/0224422 A1    Sep. 9, 2010

(30) Foreign Application Priority Data
Jan. 19, 2006    (DE) .......................... 10 2006 002 711

(51) Int. Cl.
G01G 23/00    (2006.01)
(52) U.S. Cl. ................. 177/210 EM; 177/212
(58) Field of Classification Search ........... 177/210 EM, 177/212
See application file for complete search history.

(56) References Cited

U.S. PATENT DOCUMENTS

| | | |
|---|---|---|
| 4,799,561 A | 1/1989 | Komoto |
| 4,832,092 A | 5/1989 | Hirose et al. |
| 4,890,246 A | 12/1989 | Oldendorf et al. |
| 5,340,951 A | 8/1994 | Hungerbuhler et al. |
| 6,326,562 B1 | 12/2001 | Burkhard et al. |
| 6,365,847 B1 | 4/2002 | Muller et al. |
| 6,693,245 B2 * | 2/2004 | Watabiki et al. ....... 177/210 EM |
| 6,861,593 B2 * | 3/2005 | Kuhlmann et al. ..... 177/210 EM |
| 2006/0096790 A1 | 5/2006 | Muehlich et al. |
| 2007/0034419 A1 | 2/2007 | Kuhlmann et al. |
| 2007/0125185 A1 | 6/2007 | Hauck |

FOREIGN PATENT DOCUMENTS

| | | |
|---|---|---|
| DE | 32 18 943 A1 | 11/1983 |
| DE | 32 43 350 A1 | 9/1984 |
| DE | 93 18 284 U1 | 4/1994 |
| DE | 195 40 782 C1 | 12/1996 |
| EP | 0 981 041 A2 | 2/2000 |
| GB | 2 285 871 A | 7/1995 |
| JP | 07-294317 A | 11/1995 |
| JP | 2002-107220 A | 4/2002 |
| JP | 2003-247886 | 9/2003 |
| WO | WO 03/002954 A1 | 1/2003 |

OTHER PUBLICATIONS

JPO, Office Action issued Feb. 2, 2011 in corresponding Japanese Patent Application No. 2009-524025 (7 pages) (partial English translation).
JPO, Decision of Refusal issued May 19, 2011 in corresponding Japanese Patent Application No. 2008-550631 (1 page).
JPO, Reason for Refusal issued Jan. 31, 2011 in corresponding Japanese Patent Application No. 2008-550631 (7 pages) (partial English translation).

* cited by examiner

Primary Examiner — Randy W Gibson
(74) Attorney, Agent, or Firm — The Culbertson Group, P.C.

(57) ABSTRACT

A weighing sensor according to the principle of electromagnetic force compensation, wherein a stop is provided on the load receiver for a lever or a component carried by it.

20 Claims, 1 Drawing Sheet

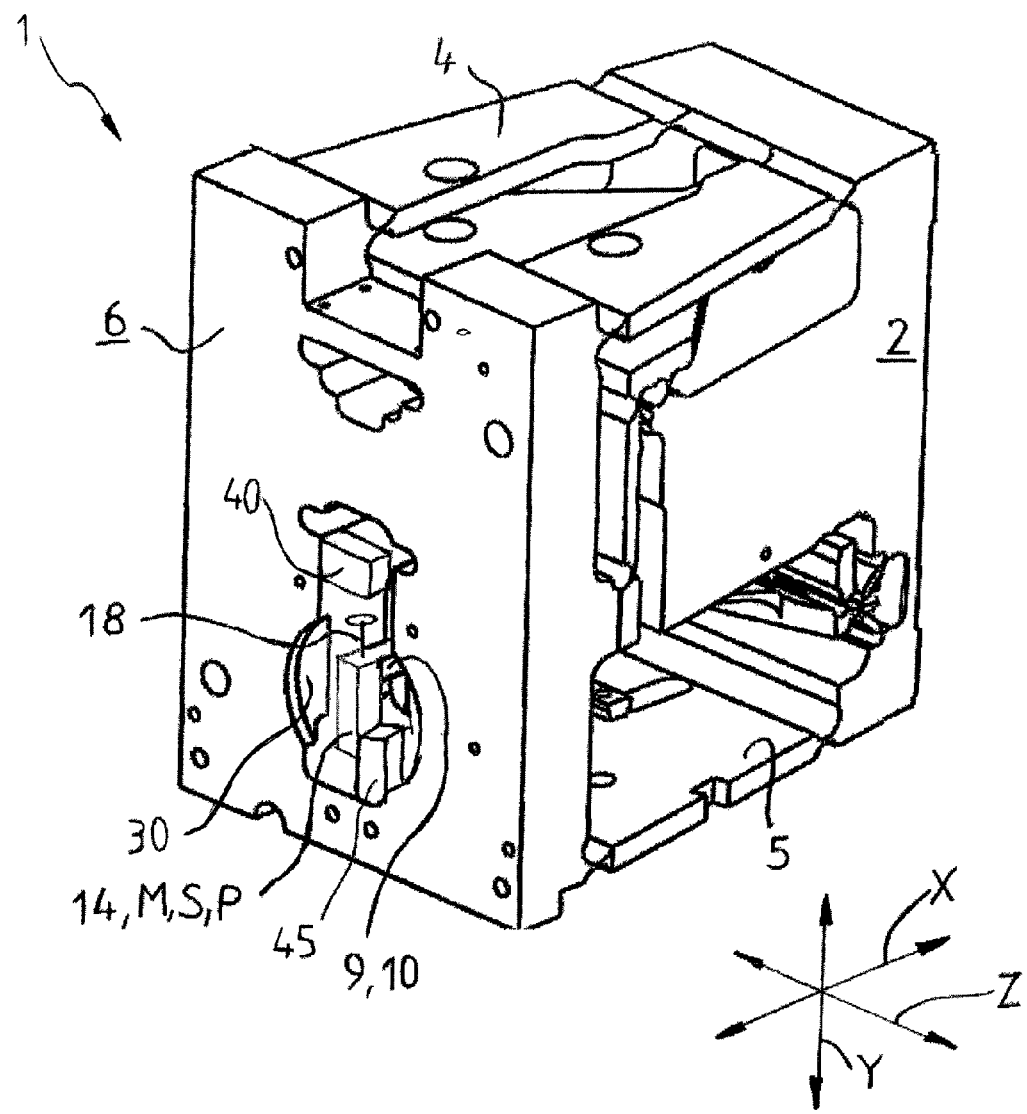

WEIGHING SENSOR HAVING A STOP STRUCTURE

FIELD OF THE INVENTION

The present invention relates to a weighing sensor with a monolithic construction, like those used for rotary filling heads or multiple-head scales.

BACKGROUND

Weighing sensors used for rotary filling heads are advantageously arranged in the shape of a circle, wherein an attempt is made to place a maximum of weighing cells on the smallest possible divided circle. This circular arrangement of weighing sensors saves installation space.

In the beverage industry, rotary filling heads are known, for example, according to DE 20304296 U, in which numerous filling stations are arranged in a circle, and very high product throughputs can be achieved due to the continuous filling. These filling machines have a filling head with a flow-rate controller, which apportions the desired quantity of fill material.

For free-flowing bulk goods, volume rotary filling heads are known. The filling head is pre-set according to the density of the fill material and directs a constant volume into the corresponding filling container. The disadvantage of these filling systems lies in the variation in density of the supplied products. Detergents can be fed, e.g., from the silo or directly from the flocculation to the filling system, and thus can have a different density due to the different pile heights. Furthermore, the construction of the volumetric filling heads limits the volume ranges and thus the weight ranges of the fill material, i.e., such systems can operate only with a limited measurement range. Volumetric rotary filling heads usually have a downstream check scale, which checks the fill weight of the packages and adjusts the filling head quantity accordingly. The disadvantage of these filling systems lies in the check weighing process, which is relatively far removed from the actual filling process and which is associated with greater waste of product with incorrect weight due to the time lag of the downstream check scale.

According to the state of the art, rotary filling heads are known which are based on the DMS weighing technique. This shows the disadvantage of the long settling time of the DMS weighing cell upon load input. This property is amplified by the rotation of the entire filling head. In addition, DMS weighing cells exhibit deflection under increasing load, which must be corrected in the state of the art with, for example, an additional correction cell (DE 372 78 66 C2).

For installation of the weighing technology in the head of a rotary filling machine with a basic circular construction, problems arise due to the installation relationships of a measurement cell. Weighing cells that are common according to the state of the art have a cuboid housing. For introduction into a divided circle, one can see that the smallest possible divided circle diameter is strongly limited by the geometric form of the measurement cell.

The weighing cells according to the state of the art shown in EP 1 409 971 with a wide fixed linkage and a trapezoidal parallelogram guidance are not suitable for accommodation in a divided circle.

EP 518202 B1 discloses a weighing sensor in which the individual functional units of the block system are implemented by means of thin sections. The figures show a weighing sensor with a narrow construction, but again there is the problem that the force-compensating magnet system represents the greatest width of the system, and this lies opposite the load-receiving side as is known in the state of the art. The diameter of the divided circle is also here definitively defined by the magnet arrangement.

The length dimensions of the weighing cells produce another disadvantage. The state of the art demonstrates weighing cells that have a parallelogram-guidance load receiver, wherein there are elastic linkages between the upper and lower parallelogram arms that reduce the magnitude of an applied force. The state of the art here demonstrates different weighing sensors with up to four force-converting stages, wherein systems with very high force-conversion ratios up to 1500:1 are to be found primarily in static applications.

The weighing sensors known according to the state of the art are constructed with a compensation lever that is extended up to the compensation system. In the case of electromagnetic force compensation, this is a system consisting of a coil and a permanent magnet system. The magnet is arranged, as described, e.g., in DE 19923207 C1, behind the force-reducing linkages. Among other things, the upper and lower parallelogram arms for the moving load receiver are constructed on the fixed part.

For monolithic weighing systems manufactured by machining, the state of the art is represented by an arrangement of load receivers, force converting levers, stationary base elements, and magnet systems lying spatially one behind the other. Furthermore, the state of the art shows us a magnet surrounded by block material, in order to achieve high measurement accuracy of the system. Such a system is not suitable for a circular arrangement with the goal of smallest possible diameter of the divided circle. A construction with a magnet arranged between the two parallelogram carriers (e.g., in DE 3243350 C2) can indeed have a space-saving arrangement, but the lever principle and the limited force conversion ratio of the system in this arrangement limits the use to a very limited weight range.

For suitability of a weighing sensor according to the principle of electromagnetic force compensation in a circular arrangement, the construction of the narrowest possible form for the weighing cell is essential. The disadvantage of such a construction lies in the weakening of the Roberval-type linkages with respect to torsion perpendicular to the introduction of force in the transverse direction of the block system. From the state of the art, it is known that monolithic weighing sensors between the load receiver and the first lever (and the other force converting levers) are advantageously constructed with a coupling element consisting of an intermediate bar and two thin sections. Furthermore, an advantageous design in the state of the art has involved constructing a thin section in the first coupling rod in the longitudinal direction of the load receiver, in order to avoid torsional moments on the force converting lever. As an example here, the publication EP 291 258 A2, especially FIG. 2, can be referenced.

The combination of narrow Roberval-type linkages (for forced parallel guidance of the load receiver) and the cited thin section leads to a less torsion-resistant weighing sensor in case of eccentric force introduction in the transverse direction of the block. Therefore, in EP 1550849A2 it was mentioned to construct the parallelogram arms accordingly wider than the block system, which represents a considerable added expense relative to the original, primarily two-dimensional weighing sensor.

DE 200 07 781 U1 discloses a weighing sensor with several force converting levers, in which a calibration weight can be selectively lowered onto or raised from a lever section. As long as the calibration weight is not being used, it can be pushed by mean of a separate lifting mechanism against the base element constructed as a stationary base, which then acts as a stop.

SUMMARY OF THE INVENTION

In view of the disadvantages named above, the solution is to create a weighing sensor which is constructed as short as possible (with respect to the distance between load receiver and stationary base). Simultaneously, the construction should be as narrow and compact as possible and should provide a reliable, adequate force conversion ratio that is largely free from interfering forces. In this way, a maximum of weighing cells should be able to be provided on the smallest possible divided circle for a circular arrangement.

The weighing sensor can be formed with an especially space-saving and short construction if the load receiver has a stop for a lever of the force converting mechanism. Alternatively or additionally, the stop can also be provided for components of a force-compensation system or also for a compensation weight for at least partially compensating an initial load that is applied to the load receiver or that is intrinsic to the system. Such a stop according to the invention is especially helpful for the case in which a lever construction is designed for a weighing sensor in such a way that the last lever in the direction of force flow extends in the direction toward the load receiver.

For the compact configuration of the weighing sensor which can be achieved by the previously described lever guidance, a stop is advantageously provided as overload protection for the last lever. While such a stop is constructed relative to the stationary base in the state of the art, the weighing sensor presented here uses the load receiver instead of the stationary base for forming the stop in the way according to the invention. This allows for the elimination of the preparation of a solid-body section for such a stop, which simplifies the overall configuration. Instead, if there is an overload, the last lever or another element arranged on this lever can strike against the load receiver or a stop part arranged on this load receiver, and thus over-extension of connecting rods or an undesirably high deflection of levers is prevented.

Therefore, in the sense of this invention, a weighing sensor is provided which advantageously has a monolithic construction. It is intended for use in an electronic scale according to the principle of electromagnetic force compensation, wherein the weighing sensor features extensions in three different directions X, Y, and Z. Also provided is an electromagnetic force compensation system which comprises a coil, a magnet, or a part of a position detection system.

The weighing sensor here has a section of a stationary base element, to which parallel guide elements are coupled that extend essentially along a first direction X and guide a load receiver that can move in the measurement direction (direction Y) relative to the base element. Here, at least one lever and at least one coupling element are provided as a series of elements effectively connected one behind the other, wherein the elements are constructed for transmission or conversion of a load acting on the load receiver and for forwarding it to the force compensation system.

Here, at least one component of the force compensation system is arranged on a lever arm of the last lever in the direction of force flow of the elements connected in series.

In comparison with the weighing sensors known from the state of the art, the present weighing sensor according to the invention differs in that the load receiver has a stop in the Y direction or Z direction for the last lever or for at least one component arranged on this lever, such as, e.g., a compensation weight.

In the non-energized or overloaded state of the weighing sensor, the last lever in the direction of force flow can be deflected too far if a corresponding stop is not provided as a travel limit. Instead of providing this stop on the stationary base according to the state of the art, it is now constructed in a space-saving and functional way directly on the load receiver, with which the corresponding lever arm then interacts according to the invention. Alternatively, a compensation weight arranged on the lever or another component can strike against the load receiver if the loading or load release of the weighing sensor triggers a corresponding movement.

In addition, this produces the advantage that the last lever, which should extend advantageously in the direction of the load receiver, requires no additional add-on parts or formations in order to interact with a section projecting from the stationary base. Instead, the lever can be guided, for example, on a straight line in the direction of force flow, further toward the load receiver in order to be secured there by means of a simple stop device. Neither a projecting stationary base nor extremities nor special lever geometries to be provided on the lever especially for the stop function are necessary. This advantageously simplifies the lever design and thus the weighing sensor.

According to another advantageous embodiment of the invention, it is provided that the stop be formed by a stop part arranged indirectly or directly on the load receiver. Advantageously, this stop part is an element which is to be fixed on the load receiver and which projects, for example, into the inner space of the weighing sensor, in order to limit the movement of the last lever in the Y direction. Additionally or alternatively, according to the invention, this part or another stop part can also prevent movement in the Z direction, if it is arranged or mounted suitably on the load receiver. According to the invention, the stop part should be capable of adjustment or calibration, in order to provide the maximum deflection path of the lever or the components carried by it.

The stop part can also be mounted indirectly on the load receiver, in that it is connected to the load receiver by means of another component, while this other component can also be used predominantly for a different purpose.

Another embodiment of the invention provides that the stop be formed indirectly or directly by at least one recess of the load receiver. Here the last lever or a compensation weight arranged on this lever or one of the components of the force compensation system should project into or through the recess at least also for the purpose of the stop. The recess can be an indentation in the load receiver or also an opening completely penetrating through the load receiver.

While a stop part arranged on the load receiver was described above for realizing the stop function, the last design can also manage without such a separate stop part, because the edge of the recess takes over the function of the stop part in this case.

Because the passage of individual components of the weighing sensor through a recess of the load receiver can be advantageous for various reasons (better lever effect, improved accessibility), the simultaneous use of the recess in the load receiver as a stop simplifies the construction of the weighing sensor in an elegant way.

According to the invention, it can involve one or several recesses, which advantageously pass completely through the load receiver. For example, a recess arranged in the center is possible, through which passes a lever section of the last lever also guided in the center. This recess can in particular be designed symmetric to a plane running in the X-Y direction, wherein this should also include a recess that starts from the plane and extends toward both sides. Advantageously but not necessarily, the plane divides the load receiver symmetrically.

Alternatively, recesses are also conceivable that pass through the load receiver spaced apart symmetrically from the center plane described above, wherein the last lever to be limited in its freedom of motion, or the components carried by it, are then also advantageously divided symmetrically in order to project into the mentioned recesses.

However, the recess does not necessarily have to be arranged symmetric to the previously described plane, but instead an asymmetric arrangement of the recess in the load receiver is also conceivable, with corresponding arrangement of the component to be protected. The asymmetric lever guide and the resulting asymmetric arrangement of the recess in the load receiver can be useful especially for reasons of space, when it can have an especially compact construction due to the asymmetric form.

Finally, one or more recesses can involve the edge region of the load receiver, so that they are not completely enclosed by the material of the load receiver. In this case, the component projecting through the recess would be accessible laterally, which would produce, for example, an advantage in assembly. The production of such recesses can also be realized in a simple way.

In another advantageous embodiment of the invention, the compensation weight, which can interact with the load receiver as a stop, can be attached from the side of the load receiver facing away from the base element section. Thus, the compensation weight can be easily mounted or adjusted, which simplifies the overall use of the weighing sensor. Here, the spatial extension of the compensation weight can affect the free path over which the last lever can travel. A compensation weight, for example, with a larger extent in the Y direction, strikes against the inner sides of the recess earlier than a weight with a smaller extent in this direction. Thus, by selecting the dimensions of the compensation weight, the maximum permissible excursion of the last lever or its components can be fixed essentially independently of the shape of the recess, which is also simplified by the easy accessibility.

The compensation weight can be composed of several individual weights, which, in their sum, determine the total compensation weight. At least one of these weights can have a rotationally symmetric construction, wherein, among these several compensation weights, optionally with different forms, at least this one weight projects into the recess of the load receiver. For a similarly rotationally symmetric recess in the load receiver, through the shape of the compensation weight, the permissible deflection in the Y or Z direction is set by the resulting annular space between the weight and recess.

The compensation weight can be used, in particular, for compensating an initial load or also for reducing the influence of vibrations (e.g., ground vibrations).

According to another advantageous embodiment of the invention, an adjustment is performed for targeted positioning of the center of gravity formed by the one or more compensation weights or the last lever. In particular, for moving weighing sensors, inertial forces appear that can load, among other things, the bearing points of the lever. If the weighing sensor rotates, for example, about an axis parallel to the Y direction, then centrifugal forces are produced on the last lever and the one or more compensation weights. These centrifugal forces must be absorbed by the bearing of the last lever. To prevent simultaneous bending moments within the lever, according to the invention, the common center of gravity of the arrangement made from the compensation weights or the last lever should be capable of adjustment. This can be realized in a simple case by an adjustment screw, whose own center of gravity is adjustable relative to the previously mentioned components, so that the common inertial forces (from the adjustment screw and the previously mentioned components) can be equalized or compensated for a moving weighing sensor with respect to a bearing point of the last lever. In particular, an adjustment of the center of gravity in the Y or Z direction should be possible according to the invention.

According to the invention, the compensation weight can also be provided as an initial weight compensation.

Other advantageous embodiments emerge from the subordinate claims and from the detailed description and the single drawing.

BRIEF DESCRIPTION OF THE DRAWING

The single FIGURE shows a weighing sensor in a schematic, perspective view according to one embodiment of the invention.

DETAILED DESCRIPTION OF PREFERRED EMBODIMENTS

Depicted in the single FIGURE is a weighing sensor 1 in a schematic, perspective view. A section 2 of a base element, which is to be designated as a stationary base, here supports two parallel guide elements 4 and 5 that extend forward in the X direction toward a load receiver 6. A lever mechanism, which is not shown in more detail and which is arranged essentially between the load receiver 6 and the base element section 2, causes the transmission of the weight force introduced into the load receiver 6 in the Y direction.

A recess 30 is formed in the load receiver 6 through which a few components of the weighing sensor are to be seen. The lever arm 10 of a last lever 9 extends in the X direction from the section 2 into the recess 30. The last lever 9 carries a schematically shown component M, S, P of a force compensation system with which the deflection of the lever 9 is compensated in order to derive a measurement value from this deflection. The components M, S, P can also be arranged somewhat displaced into the interior of the weighing sensor 1. A compensation weight 14 can also be arranged on the lever arm 10 instead of or in addition to the previously mentioned components.

The compensation weight 14 carries an adjustment device 18, which is constructed as a screw and which shifts its center of gravity relative to the lever 9 by means of a screwing motion in order to compensate inertial forces due to movements of the weighing sensor.

According to the invention, the load receiver 6 has a stop for the last lever 9 or the components carried by it. For example, an upper stop part 40 is shown which limits a pivoting motion of the lever 9 in the Y direction. Here, the adjustment device 18 can interact with the stop part 40, wherein, however, the stop can also be formed in an arbitrarily different manner, and in particular, without integration of the adjustment device 18.

Alternatively or additionally, another stop part 45 can be provided that limits movement of the lever 9, or the components carried by lever 9, in the Z direction. The wall of the recess 30 itself can also act as a direct stop surface. Between the components 14, M, S, P on one side and the stop part 45 there is actually a spacing. This spacing, although apparent from this description, is obscured somewhat in the figure due to the perspective of the figure.

In the Figure, the arrangement of the stop part (40, 45) in the interior of the recess 30 is shown. However, the stop part can also be arranged on the inside or outside of the load receiver 6.

As used herein, the terms "comprising," "including," "having," "containing," "involving," and the like are to be understood to be open-ended, that is, to mean including but not limited to.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A weighing sensor for an electronic scale according to the principle of electromagnetic force compensation, with elements that extend in a first direction (X), a second direction (Y) perpendicular to the first direction, and a third direction (Z) perpendicular to the directions (X) and (Y), with at least one electromagnetic force compensation system that comprises a coil (S) or a magnet (M) or a part of a position detection system (P), the weighing sensor further comprising:
   a) a stationary base element section to which parallel guide elements are coupled that extend essentially along the X direction and guide a load receiver moving in the Y direction relative to the base element;
   b) wherein at least one of one or more levers and at least one of one or more coupling elements are provided as a series of elements effectively connected one behind the other, and wherein the series of elements are constructed for the transmission or conversion of a load acting on the load receiver and for passing the load on to the electromagnetic force compensation system;
   c) wherein components of the electromagnetic force compensation system (M, S, or P) are arranged on a lever arm of a selected last lever of the one or more levers; and
   d) wherein the load receiver has a stop in the Y direction or in the Z direction for the selected last lever of the one or more levers or for at least one component arranged on the selected last lever.

2. The weighing sensor of claim 1, wherein the stop is formed by a stop part arranged indirectly or directly on the load receiver.

3. The weighing sensor of claim 1, wherein the stop is formed indirectly or directly by at least one recess of the load receiver, wherein the selected last lever, or a compensation weight arranged on the selected last lever, or one of the components (M, S, or P) also projects into or through the recess for the purpose of stopping.

4. The weighing sensor of claim 3, wherein the one or more recesses have a symmetric or asymmetric construction relative to an imaginary plane dividing the load receiver in the X-Y direction.

5. The weighing sensor of claim 3, wherein the one or more recesses are not closed.

6. The weighing sensor of claim 1, wherein a compensation weight is attached to the selected last lever of the one or more levers as a stopping component on the side of the load receiver facing away from the base element section.

7. The weighing sensor of claim 1, wherein a compensation weight projects as a stopping component into a recess of the load receiver.

8. The weighing sensor of claim 1, further including an adjustment device for selective positioning of a common center of gravity of the selected last lever, and the at least one component carried by the last lever.

9. The weighing sensor of claim 1, wherein a compensation weight is provided as an initial weight compensation.

10. The weighing sensor of claim 1, further including a compensation weight which has a rotationally symmetric construction.

11. The weighing sensor of claim 1, wherein the weighing sensor is a monolithic weighing sensor.

12. An electronic scale according to the principle of electromagnetic force compensation, with elements that extend in a first direction (X), a second direction (Y) perpendicular to the first direction, and a third direction (Z) perpendicular to the directions (X) and (Y), with at least one electromagnetic force compensation system that comprises a coil (S) or a magnet (M) or a part of a position detection system (P), the electronic scale including a weighing sensor further comprising:
   a) a stationary base element section to which parallel guide elements are coupled that extend essentially along the X direction and guide a load receiver moving in the Y direction relative to the base element;
   b) wherein at least one of one or more levers and at least one of one or more coupling elements are provided as a series of elements effectively connected one behind the other, and wherein the series of elements are constructed for the transmission or conversion of a load acting on the load receiver and for passing the load on to the electromagnetic force compensation system;
   c) wherein components of the electromagnetic force compensation system (M, S, or P) are arranged on a lever arm of a selected last lever of the one or more levers; and
   d) wherein the load receiver has a stop in the Y direction or in the Z direction for the selected last lever of the one or more levers or for at least one component arranged on the selected last lever.

13. The electronic scale of claim 12, wherein the stop is formed by a stop part arranged indirectly or directly on the load receiver.

14. The electronic scale of claim 12, wherein the stop is formed indirectly or directly by at least one recess of the load receiver, wherein the selected last lever, or a compensation weight arranged on the selected last lever, or one of the components (M, S, or P) also projects into or through the recess for the purpose of stopping.

15. The electronic scale of claim 14, wherein the one or more recesses have a symmetric or asymmetric construction relative to an imaginary plane dividing the load receiver in the X-Y direction.

16. The electronic scale of claim 14, wherein the one or more recesses are not closed.

17. The electronic scale of claim 12, wherein the compensation weight can be attached to the selected last lever of the one or more levers as a stopping component on the side of the load receiver facing away from the base element section.

18. The electronic scale of claim 12, wherein a compensation weight projects as a stopping component into a recess of the load receiver.

19. The electronic scale of claim 12, further including an adjustment device for selective positioning of a common center of gravity of the selected last lever, and the at least one component carried by the last lever.

20. The electronic scale of claim 12, wherein a compensation weight is provided as an initial weight compensation.

* * * * *